Feb. 23, 1954 G. W. FYLER 2,670,438

AUTOMATIC FREQUENCY CONTROL CIRCUIT

Filed July 10, 1948 3 Sheets-Sheet 1

*INVENTOR.*
George W. Fyler

*BY*

Norman L. Mueller
Atty

INVENTOR.
George W. Fyler
BY
Foorman L. Mueller
Atty.

Feb. 23, 1954 G. W. FYLER 2,670,438

AUTOMATIC FREQUENCY CONTROL CIRCUIT

Filed July 10, 1948 3 Sheets-Sheet 3

*INVENTOR.*
George W. Fyler
*BY*
Foorman L. Mueller
Atty.

Patented Feb. 23, 1954 2,670,438

UNITED STATES PATENT OFFICE 2,670,438

AUTOMATIC FREQUENCY CONTROL CIRCUIT

George W. Fyler, Lombard, Ill., assignor to Motorola, Inc., Chicago, Ill., a corporation of Illinois Application July 10, 1948, Serial No. 38,025

8 Claims. (Cl. 250—36)

This invention relates generally to frequency control systems and more particularly to an automatic frequency control system for holding the horizontal deflection system of a television receiver in synchronism with synchronization pulses.

In television receiving systems, the beam of a cathode ray tube is scanned vertically and horizontally so that the beam traverses the screen in a predetermined manner. Both the horizontal or line, and vertical or field scanning must be synchronized with the scanning in the transmitting equipment and to accomplish this synchronization signals are provided. The horizontal or line scanning takes place at a very rapid rate (15,750 cycles per second) and this frequency must be accurately controlled. Direct control by synchronization pulses is not entirely satisfactory as the synchronization pulses may occur with some irregularity and/or noise pulses may trigger the deflection system resulting in irregularity in the scanning frequency causing distortion or tearing of the television picture. To overcome this difficulty, it has been proposed to provide automatic frequency control systems for controlling the frequency of the deflection system in accordance with the frequency of the synchronization pulses without positively locking the deflection system with the individual synchronization pulses. Although these systems have provided great improvement, they have been relatively complicated and require a large number of tubes. Many automatic frequency control systems now in use have required three tubes in addition to the means for deriving the synchronization signals, and the deflection system itself.

It is, therefore, an object of this invention to provide a simple automatic frequency control system for controlling the horizontal deflection generator of a television receiver.

Another object of this invention is to provide an improved system for controlling the frequency of an electric wave generator in accordance with synchronization pulses.

A feature of this invention is the provision of an automatic frequency control system in which a single diode provides a varying direct current for controlling the frequency of an electric wave generator.

A further feature of this invention is the provision of an automatic frequency control system which combines constant amplitude synchronization pulses with pulses derived from the output of a generator and produces a direct current varying with the sum of the pulses for controlling the frequency of the generator.

Further objects, features and advantages will be apparent from a consideration of the following description taken in connection with the accompanying drawings in which.

In practicing the invention an automatic frequency control system is provided for controlling the frequency of an electric wave generator in accordance with synchronization pulses, and which requires only a two-element electron discharge valve. The system may be used with various generator circuits as, for example, blocking oscillators or multivibrators. The synchronization pulses are applied to one electrode of the valve, and pulses derived from the generator are applied to the other electrode in opposite phase. The pulses from the generator may be obtained by differentiating a sawtooth wave in many applications. The amplitude of the pulse current through the diodes, therefore, corresponds to the sum of the voltages of the synchronization pulses and the pulses from the generator. It will, therefore, be obvious that the current is greatest when the pulses are exactly in phase and the current decreases as the pulses shift in phase with respect to each other. This current is applied to the input circuit of the generator to control the frequency thereof.

Figure 1:
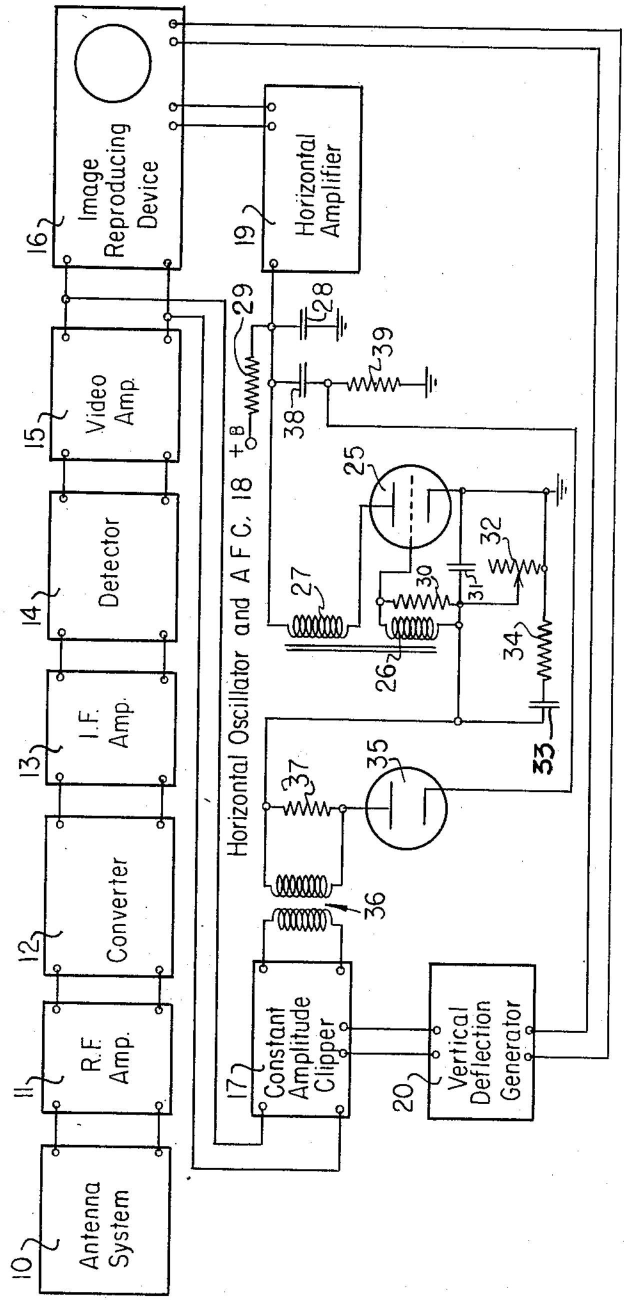
Fig. 1 is a schematic diagram of a television receiver incorporating the control system of the invention.

Referring more particularly to the drawings, in Fig. 1 there is illustrated a television receiver incorporating the automatic frequency control system in accordance with the invention, with the standard components of the receiver shown in block diagram. The receiver includes an antenna system 10 adapted to receive and select both a video modulated carrier wave and an audio modulated carrier wave. The received waves are further selected and amplified in radio frequency amplifier 11 and then applied to converter 12 where they are reduced to waves of intermediate frequency. The intermediate frequency waves are amplified in intermediate frequency amplifier 13 and the video signal is derived therefrom by detector 14. The video signals are amplified in video amplifier 15 and then applied to image reproducing device 16 and clipper 17. A sound system may also be provided in the television receiver and may derive intermediate frequency sound signals from intermediate frequency amplifier or intercarrier sound signals from the video amplifier. Both of these systems are well known in the art.

For deflecting the beam of the image reproducing device, a horizontal deflection generator is provided including horizontal oscillator and automatic frequency control circuit 18 and horizontal amplifier 19. For providing the vertical deflection energy, vertical deflection generator 20 is provided. The present invention relates to the automatic frequency control circuit for the horizontal oscillator and, therefore, only these components are shown in detail. The other components may be of any suitable standard construction and will not be further described.

Referring now to the horizontal oscillator and automatic frequency control system 18, it is to be noted that the oscillator is of the blocking oscillator type including a triode 25 and a blocking oscillator transformer including grid winding 26 and plate winding 27. The blocking oscillator may provide a positive going sawtooth voltage wave across condenser 28 in a well known manner. Operating potential is provided for the tube 25 through resistor 29 connected to +B. The grid is connected to an RC circuit including condenser 30 and variable resistor 32 which may be adjusted to set the frequency of oscillation.

For automatically controlling the frequency of the blocking oscillator in accordance with the synchronization pulses, the diode 35 is provided. The positive synchronization pulses from the clipper 17 are applied to the plate of the diode through transformer 36, the secondary of which is shunted by damping resistor 37. The transformer and damping resistor form a damped resonant circuit which produces an output wave having a positive portion followed by a negative portion to thereby form a full cycle. It is to be pointed out that the clipper 17 must be of the constant amplitude type so that the amplitude of the synchronization pulses applied to the plate of diode 35 is always the same. The sawtooth voltage wave appearing across condenser 28 is differentiated by the circuit including condenser 38 and resistor 39 and applied to the cathode of the diode 35. In such a system the voltage across the condenser 28 will kick negatively when the blocking oscillator fires so that the differentiating circuit will provide a negative pulse during this time. For proper synchronization the blocking oscillator should fire shortly after the synchronization pulse arrives. Although as previously stated, it is not desired that the oscillator be locked positively with the pulses, the average frequency of the oscillator should be the same as the average frequency of the synchronization pulse.

Figure 2:
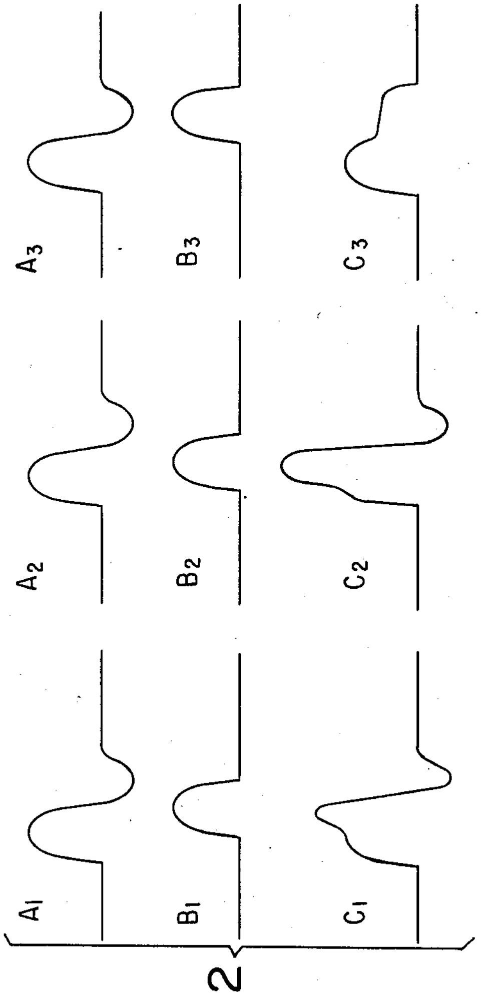
Fig. 2 is a plurality of curve charts illustrating operation of the control system.

Fig. 2 shows the operation of the system under a plurality of conditions with curves A and B representing the synchronization pulses and the differentiated pulses derived from the oscillator respectively. To simplify the illustration the negative pulses B applied to the cathode are shown positive as they have the same effect as positive pulses applied to the anode. The synchronization pulses at the output of the transformer are waves each of which includes a positive portion followed by a negative portion. Curves $A_1$ and $B_1$ show the pulses positioned in the desired manner so that the oscillator is properly synchronized with the synchronization pulses. Curve $C_1$ illustrates the voltage produced across the diode with the pulses $A_1$ and $B_1$ applied thereto. As previously stated, the pulses applied to the cathode of diode 35 are negative but this has the effect of a positive pulse on the plate and, therefore, the curves B are inverted so that the voltage produced by combining the synchronization pulses with the differentiated pulses is more readily apparent. Curves $A_2$ and $B_2$ represent a condition in which the oscillator fires too early so that the pulses are too nearly in phase. Curves $A_3$ and $B_3$ illustrate the condition when the oscillator is too slow and the phase displacement between the pulses is too great. Curves $C_2$ and $C_3$ illustrate the voltage across the diode 35 in the system of Fig. 1 under the above stated conditions. The current through diode 35 corresponds generally to the voltage applied thereto not corresponding exactly because of the negative bias from condenser 31. The current wave will, of course, not include the negative portion of the cycle as no current will flow through the diode when the plate is negative with respect to the cathode.

As illustrated in Fig. 1 the diode current is applied to the RC grid circuit of the tube 25 of the blocking oscillator. The diode current is applied through the time constant circuit including condenser 31 and variable resistor 32 and in effect applies a negative current to the RC grid circuit which determines the frequency. As is well known, increase in the negative current will slow the oscillator, and decrease of the negative current will speed up the oscillator. A long time constant is provided by providing the shunt path including condenser 33 and resistor 34 which provides better flywheel effect and by making resistor 34 sufficiently large, the system may be rendered highly stable.

Figure 3:
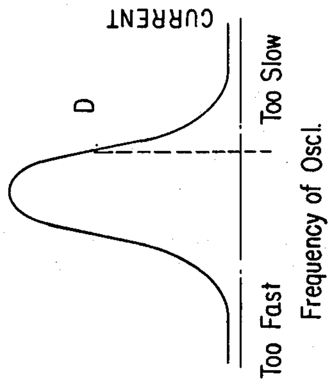
Fig. 3 is a curve illustrating the control produced in accordance with the invention.

Referring again to Fig. 2 it will be seen that when the oscillator is too fast ($B_2$) the current ($C_2$) in the diode will be larger and this will slow the oscillator. When the oscillator is too slow ($B_3$) the current ($C_3$) is less and the oscillator will speed up. Fig. 3 shows this control with the point D indicating the normal operating point. As the oscillator frequency slows the current will decrease, and as the oscillator frequency becomes too fast the current will increase. It is obvious that satisfactory operation can be had only by using the right side of the curve whereas on the left side of the curve the control would be exactly opposite to that desired.

Figure 4:
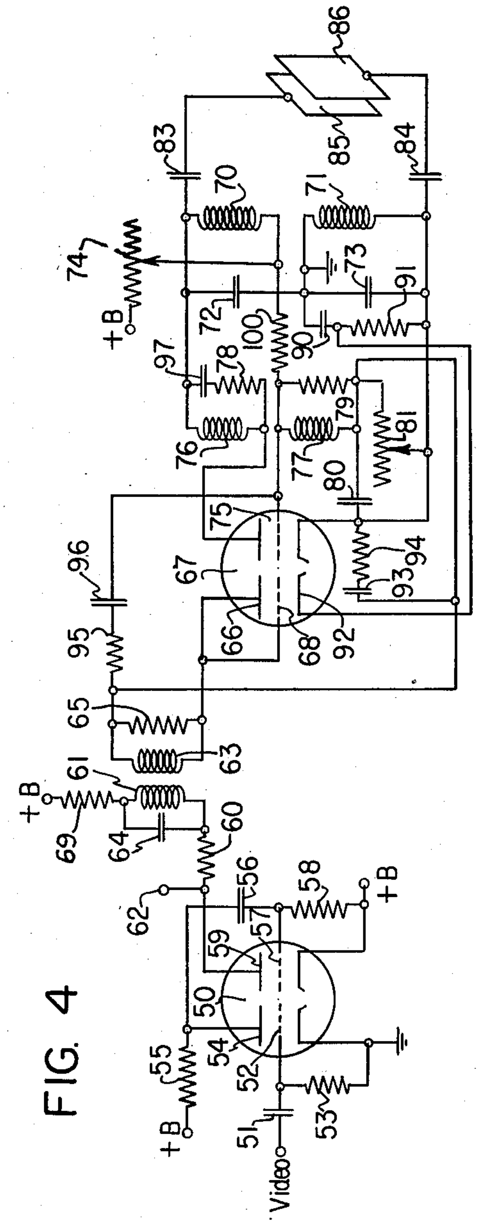
Figs. 4, 5 and 6 illustrate the use of the frequency control system in accordance with the invention in particular deflection systems.

Fig. 4 shows the application of the automatic frequency control system in a generator for producing electrostatic deflection. The system includes a double clipper formed by the two triode sections in tube 50. The video signal is applied through coupling condenser 51 to the grid 52 of the first triode section. The grid 52 is biased by grid current which flows through resistor 53 and the plate 54 is connected to +B through resistor 55. The output of the first section is applied through condenser 56 to the grid 57 of the second section which is biased by resistor 58. The plate 59 of the second triode section is connected through resistor 60, winding 61 and dropping resistor 69 to +B. Due to the double clipping action, the clipper provides constant amplitude pulses which may be applied to both horizontal and vertical deflection systems. The integrator for the vertical deflection system may be connected to the terminal 62.

Synchronization pulses are applied to the horizontal deflection system through a pulse transformer which includes windings 61 and 63. The winding 61 is tuned by condenser 64 to eliminate high frequency video signals. The damping resistor 65 is connected across the winding 63 to eliminate undesirable oscillations in the transformer. The synchronization pulses are applied by the transformer to the plate 66 of the first triode section of tube 67. A double triode tube is used for the automatic frequency control system and the horizontal deflection generator for the sake of simplicity. Actually a diode is all that is required in the automatic frequency control system and the grid 68 and plate 66 of the triode are connected together so that the tube functions merely as a diode.

The sawtooth voltage generator of Fig. 4 is in accordance with my copending application Serial No. 20,250, filed April 10, 1948, subject "Sawtooth Voltage Generator." In this system a balanced charging circuit is provided including closely coupled inductors 70 and 71 connected in series with condensers 72 and 73 and resistor 74 to a source of potential. A blocking oscillator including a triode 75 and transformer including windings 76 and 77 discharges the condensers 72 and 73 so that sawtooth voltage waves are produced thereacross. Damping resistors 78 and 79 are provided across the windings and the frequency of the oscillator is controlled by condenser 80 and variable resistor 81. The sawtooth voltages appearing across condensers 72 and 73 are applied through coupling condensers 83 and 84 to deflection plates 85 and 86 respectively.

The automatic frequency control system is coupled to the deflection generator by the differentiating circuit including condenser 90 and resistor 91 which are connected across the main discharge condenser 73. The differentiating circuit provides negative pulses which are applied to the cathode 92 of the automatic frequency control tube. The synchronization pulses applied to the plate 66 of the automatic frequency control tube are actually waves having positive and negative portions as shown in Fig. 2. As previously stated, the firing of the oscillator should preferably slightly lag the synchronization pulses as indicated by curves $A_1$ and $B_1$ in Fig. 2. The current through the automatic frequency control tube is applied to the blocking oscillator through condenser 80 and resistor 81 to effect the time of blocking thereof. To modify the time constant of the blocking oscillator frequency control the shunt circuit including condenser 93 and resistor 94 is provided. Resistor 95 and condenser 96 are provided for damping the blocking oscillator in order to eliminate transients during the sweep interval. Condenser 97 and resistor 78 are likewise required across the plate coil 76. Resistor 100 causes a relatively constant direct current to flow to the grid of the triode 75 and permits the use of a resistor 81 of larger value than would otherwise be permitted. This provides a somewhat greater range of control of the natural frequency of the blocking oscillator. This resistor is connected to the movable arm on resistor 74 which controls the amplitude of the deflection generator so that the frequency of the oscillator is substantially independent of the amplitude.

The operation of the system in Fig. 4 is completely in accordance with that illustrated by the curves of Figs. 2 and 3. When the oscillator runs too fast the voltages in the automatic frequency control tube will be in phase providing a large current to the oscillator which reduces the frequency thereof. Conversely, slowing of the oscillator increases the phase displacement between the pulses and reduces the current so that the frequency is increased. As indicated in Fig. 3 the system will operate over a relatively wide range so that it provides the required correction and is not unduly critical. The system is simple and inexpensive as indicated in Fig. 4 in which a single tube including two triode sections provides both the automatic frequency control and the horizontal deflection system. The oscillator is held in step with the synchronization pulses as required and yet is not so locked to the pulses that tearing of the picture is produced when the pulses are irregular or interrupted by noise.

In systems constructed in accordance with the invention and found to be successful in use, the following values have been used in the circuit of Fig. 4:

| | |
|---|---|
| Tube 50 | 12SN7GT |
| Tube 67 | 12SN7GT |
| Condenser 51 | .05 microfarads |
| Resistor 53 | 2.2 megohms |
| Resistor 55 | 1 megohm |
| Condenser 56 | .05 microfarads |
| Resistor 58 | 10,000 ohms |
| Resistor 60 | 6,800 ohms |
| Coil 61 | 30 millihenries |
| Coil 63 | 8 millihenries |
| Condenser 64 | 100 micromicrofarads |
| Resistor 65 | 15,000 ohms |
| Coil 70 | 4 henries |
| Coil 71 | 4 henries |
| Condenser 72 | 900 micromicrofarads |
| Condenser 73 | 680 micromicrofarads |
| Resistor 74 | 20,000 ohms |
| Coil 76 | 8.5 millihenries |
| Coil 77 | 30 millihenries |
| Resistor 78 | 6,800 ohms |
| Resistor 79 | 39,000 ohms |
| Condenser 80 | .03 microfarads |
| Resistor 81 | 30,000 ohms |
| Condenser 83 | 500 micromicrofarads |
| Condenser 84 | 500 micromicrofarads |
| Condenser 90 | 200 micromicrofarads |
| Resistor 91 | 3,300 ohms |
| Condenser 93 | .5 microfarads |
| Resistor 94 | 4,700 ohms |
| Resistor 95 | 6,800 ohms |
| Condenser 96 | 200 micromicrofarads |
| Condenser 97 | 50 micromicrofarads |
| Resistor 100 | 220,000 ohms |

The above values are merely representative and other values may be more satisfactory in particular instances.

Figure 5:
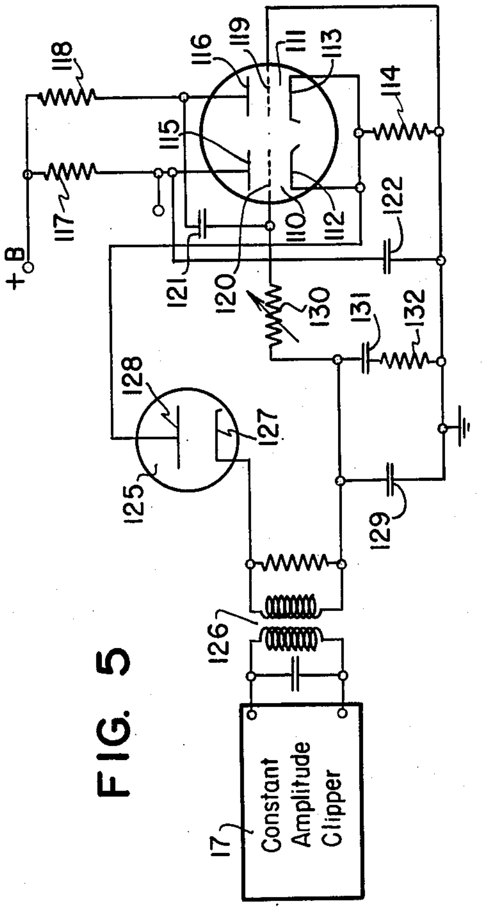
Figure 6:
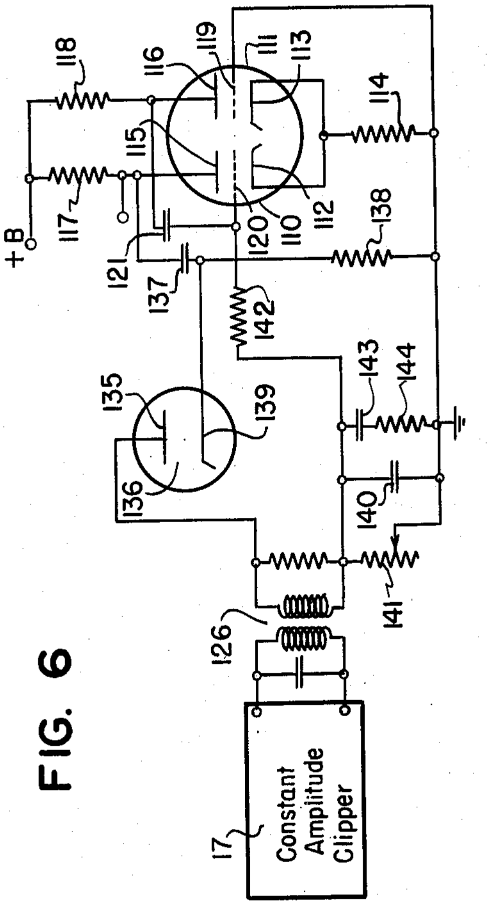

Figs. 5 and 6 illustrate the application of the automatic frequency control system to a multivibrator circuit. The multivibrator in these circuits includes triode sections 110 and 111 provided in a single envelope. The cathodes 112 and 113 of the triodes are connected together and through resistor 114 to ground. Coupling between the sections is, therefore, provided through the cathodes. The plates 115 and 116 of the triodes are connected respectively through resistors 117 and 118 to +B. Grid 119 of section 111 is connected to ground and grid 120 of section 110 is coupled through condenser 121 to the plate 116 of the section 111. A sawtooth voltage wave is developed across condenser 122 (Fig. 5) and may be used for horizontal scanning.

For controlling the frequency of the multivibrator in the system of Fig. 5, the diode 125 is provided. Constant amplitude synchronization pulses are produced by the constant amplitude clipper 17 and are applied through transformer 126 to the cathode 127 of the diode 125. The windings of the transformer 126 are so phased that negative synchronization pulses are applied to the cathode 127. The plate 128 of the diode is connected to the cathodes 112 and 113 from which positive pulses are applied to the diode. The pulses applied to the diode 125 will, therefore, be of the same form as the pulses illustrated in Fig. 2 with the pulses indicated at A being applied to the cathode and the pulses indicated at B applied to the anode. The A pulses are in this case actually negative but being applied to the cathode have the same effect as positive pulses on the anode. In this system the multivibrator fires just ahead of the synchronization pulses so that the B pulses will normally precede the A pulses. Therefore, if the multivibrator runs slow, the pulses will tend to come in phase and increased current will be provided by the diode. This will charge condenser 129 so that a positive bias is applied through resistor 130 to the grid 120 of triode. This will speed up the multivibrator so that proper synchronization will occur. If the multivibrator runs fast, the pulses will slip farther out of phase and the current will decrease so that the positive bias will decrease and the multivibrator will slow down. Condenser 131 and resistor 132 provide a flywheel effect. Condenser 131 is large to provide a long time constant and resistor 132 provides a snap action which brings the control system in operation.

The system of Fig. 6 is quite similar except the synchronization pulses are applied to the anode 135 of diode 136. Pulses from the multivibrator are obtained by the differentiating circuit including condenser 137 and resistor 138 and are applied to the cathode 139. This differentiating circuit replaces the discharge condenser 122 of Fig. 5. This system operates in the manner illustrated in Fig. 2 with the multivibrator firing just after the synchronization pulses. If the multivibrator runs too fast, the pulses ($A_2$ and $B_2$) will be in phase and cause an increased negative voltage across condenser 140 and resistor 141 which is applied through resistor 142 to produce an increased negative bias on the multivibrator to slow the speed. Conversely if the multivibrator runs too slow, the current through the diode will decrease and the negative bias will decrease to speed up the multivibrator. As in the previous modifications, a circuit including condenser 143 and resistor 144 is provided for producing a flywheel effect.

It will be seen from the above that the automatic frequency control system in accordance with the invention is of general application. Other modifications of the system may be made within the incentive concept disclosed herein. The system requires only a few inexpensive components and has been found to be very satisfactory in operation.

While I have described certain embodiments of my invention which are illustrative thereof, it is apparent that various changes and modifications can be made therein without departing from the intended scope of the invention as defined in the appended claims.

I claim:

1. A control system for holding a sawtooth wave generator in step with synchronization pulses in which the wave produced by the generator includes trace and retrace portions comprising, a differentiating circuit connected to said generator for producing a voltage pulse of one polarity corresponding in time with the retrace portion of each wave produced by said generator, means including a transformer and damping means therefor for producing a voltage wave from each synchronization pulse having a first portion of the polarity opposite to said one polarity followed by a second portion of said one polarity, an electron discharge valve having at least two electrodes, means connecting said differentiating circuit to one of said electrodes of said valve and said transformer to the other one of said electrodes of said valve, said voltage across said electrodes being relatively large when the retrace portion occurs at the beginning of said voltage wave and being relatively small when the retrace portion occurs at the end of said voltage wave, and means for controlling the generator so that the frequency thereof varies inversely with the current through said valve whereby said retrace portions are held in substantially fixed position with respect to said synchronization pulses.

2. A control system for holding a sawtooth wave generator in step with synchronization pulses, in which the generator includes a frequency controlling input circuit and an output circuit in which there is produced a positive going sawtooth wave having trace and retrace portions, said system comprising a transformer having primary and secondary windings, means for applying positive synchronization pulses to said primary winding, a condenser connected across said primary winding and a damping resistor connected across said secondary winding so that a voltage wave is produced in said secondary winding having a positive portion substantially in phase with the synchronization pulse followed by a negative portion, a differentiating circuit connected to the output circuit of the generator for producing a negative voltage pulse corresponding in time with the retrace portion of each sawtooth wave, and an electron discharge valve having at least an anode and a cathode, said cathode being connected to said differentiating circuit so that said negative voltage pulse is applied thereto, said secondary winding being connected between said anode of said valve and the input circuit of the generator so that the voltage wave from said secondary winding is applied to said anode of said valve and the current through said valve which varies with the relative position of said voltage pulse with respect to said voltage wave controls the frequency of the generator.

3. A control system for holding a blocking oscillator in step with synchronization pulses, in which the oscillator includes a frequency controlling input circuit and an output circuit in which there is produced a positive going sawtooth wave having trace and retrace portions, said system comprising a transformer having primary and secondary windings, means for applying synchronization pulses to said primary winding, means for tuning and damping said windings of said transformer so that a voltage wave is produced in said secondary winding having a positive portion substantially in phase with the synchronization pulse followed by a negative portion, a differentiating circuit connected to the output circuit of said oscillator for producing a negative voltage pulse corresponding in time with the retrace portion of each sawtooth wave, and an electron discharge valve having at least an anode and a cathode, said cathode being connected to said differentiating circuit so that said voltage pulse is applied thereto, said secondary winding being connected between said anode of said valve and the input circuit of the oscillator so that the voltage pulse from said differentiating circuit and the voltage wave from said secondary winding are applied across said valve, and the current through said valve which varies with the relative position of said voltage pulse with respect to said voltage wave controls the frequency of said blocking oscillator.

4. A control system for holding a blocking oscillator in step with synchronization pulses, which oscillator includes a frequency controlling input circuit and an output circuit in which a sawtooth wave having trace and retrace portions is produced, said control system comprising, a differentiating circuit connected to the output circuit of the oscillator for producing a voltage pulse corresponding in time with the retrace portion of each wave produced by the oscillator, a circuit including a transformer and tuning and damping means therefor for producing a voltage wave having a first portion which is in phase with the synchronization pulse and substantially 180 degrees out of phase with said voltage pulse followed by a second portion of opposite polarity to said first portion, an electron discharge valve having at least two electrodes, means connecting said differentiating circuit to one of said electrodes of said valve and said transformer to the other one of said electrodes of said valve, said voltage across said electrodes being relatively large when the retrace portion occurs at the beginning of said voltage wave and being relatively small when the retrace portion occurs at the end of said voltage wave, and means applying the current through said valve to said input circuit of said blocking oscillator so that the frequency thereof varies inversely with said current whereby said retrace portions are held in substantially fixed position with respect to the synchronization pulses.

5. A control system for holding a multivibrator in step with synchronization pulses, which multivibrator includes a frequency controlling input circuit and an output circuit in which a sawtooth voltage wave having trace and retrace portions is produced comprising, a differentiating circuit connected to the multivibrator for producing a voltage pulse corresponding in time with the retrace portion of each wave produced by the multivibrator, a circuit including a transformer and tuning and damping means therefor for producing a voltage wave having a first portion which is in phase with the synchronization pulse and substantially 180 degrees out of phase with said voltage pulse followed by a second portion of opposite polarity to said first portion, an electron discharge valve having at least two electrodes, means connecting said differentiating circuit to one of said electrodes of said valve and said transformer to the other one of said electrodes of said valve, said voltage across said electrodes being relatively large when the retrace portion occurs at the beginning of said voltage wave and being relatively small when the retrace portion occurs at the end of said voltage wave, and means applying the voltage across said rectifier to said input circuit of said multivibrator so that the frequency thereof varies inversely with the voltage across said valve and the sawtooth wave produced thereby is held in substantially fixed position with respect to the synchronization pulses.

6. A control system for holding a sawtooth wave generator which produces a sawtooth wave including trace and retrace portions in step with synchronization pulses, including in combination, differentiating means coupled to the generator for producing from the sawtooth wave voltage pulses which occur during each retrace portion thereof, resonant means for producing from each synchronization pulse a voltage wave having first and second portions of opposite polarity, voltage combining means connected to said differentiating means and to said resonant means for combining the voltages produced thereby so that the voltage pulse is effectively added to said first portion of said wave and subtracted from the second portion thereof, whereby the combined voltage is relatively large when said voltage pulse occurs at the beginning of said voltage wave and is relatively small when said voltage pulse occurs at the end of said voltage wave, and means for controlling said generator so that the frequency thereof varies inversely with the average amplitude of said combined voltage.

7. A control system for holding a generator which produces a sawtooth wave including trace and retrace portions in step with synchronization pulses, said system including in combination, differentiating means connected to the generator for producing from each cycle of the wave of the generator a voltage pulse of a given polarity which occurs during the retrace portion thereof, resonant means for producing from each synchronization pulse a voltage wave of substantially one cycle duration having a first portion in phase with the synchronization pulse and of the polarity opposite to said given polarity followed by a second portion of said given polarity, voltage combining means coupled to said differentiating means and to said resonant means for combining the voltages produced thereby, said voltage combining means including means reversing said voltage pulses with respect to said voltage wave and then adding the same so that the combined voltage is relatively large when said voltage pulse coincides with said first portion of said voltage wave and is relatively small when said voltage pulse coincides with said second portion of said voltage wave, and means for controlling the generator so that the frequency thereof varies inversely with the average amplitude of said combined voltage, whereby said sawtooth wave is controlled so that the retrace portions thereof are held in substantially fixed phase relation with respect to said synchronization pulses.

8. A control system for holding a generator which produces a sawtooth wave including trace and retrace portions in step with synchronization pulses, said system including in combination, first means connected to the generator for producing from each cycle of the wave of the generator a voltage pulse of a given polarity which occurs during the retrace portion theerof, second means for producing from each synchronization pulse a voltage wave of substantially one cycle duration having a first portion in phase with the synchronization pulse and of the polarity opposite to said given polarity followed by a second portion of said given polarity, voltage combining means coupled to said first and second means for combining the voltages produced thereby, said voltage combining means including rectifier means having a first electrode connected to said first means and a second electrode connected to said second means, so that a realtively large voltage is developed between said electrodes when said voltage pulse occurs at the same time as said first portion of said voltage wave, and a relatively small voltage is developed between said electrodes when said voltage pulse occurs at the same time as said second portion of said voltage wave, and means for applying the voltage developed across said rectifier means to said generator for controlling the frequency thereof so that the frequency of the sawtooth wave varies inversely with the average amplitude of said combined voltages, whereby the retrace portions of the wave are held in substantially fixed phase relation with respect to said synchronization pulses.

GEORGE W. FYLER.

References Cited in the file of this patent

UNITED STATES PATENTS

| Number | Name | Date |
|---|---|---|
| 2,201,978 | Bedford | May 28, 1940 |
| 2,209,507 | Campbell | July 30, 1940 |
| 2,223,840 | Wolff | Dec. 3, 1940 |
| 2,250,708 | Herz | July 29, 1941 |
| 2,265,290 | Knick | Dec. 9, 1941 |
| 2,287,174 | Heising | June 23, 1942 |
| 2,288,025 | Pomeroy | June 30, 1942 |
| 2,332,681 | Wendt | Oct. 26, 1943 |
| 2,344,810 | Fredendall et al. | Mar. 21, 1944 |
| 2,339,536 | Wendt | June 18, 1944 |
| 2,381,238 | Wendt | Aug. 7, 1945 |
| 2,396,688 | Crosby | Mar. 19, 1946 |
| 2,428,946 | Somers | Oct. 14, 1947 |
| 2,437,609 | Mayle | Mar. 9, 1948 |
| 2,458,156 | Fredendall | Jan. 4, 1949 |
| 2,459,699 | Hallmark | Jan. 18, 1949 |
| 2,479,081 | Poch | Aug. 14, 1951 |
| 2,610,298 | Zaloudek | Sept. 9, 1952 |